(12) United States Patent
Hayami

(10) Patent No.: US 9,086,938 B2
(45) Date of Patent: Jul. 21, 2015

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Yoshikazu Hayami, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/459,799

(22) Filed: Aug. 14, 2014

(65) Prior Publication Data

US 2015/0058835 A1 Feb. 26, 2015

(30) Foreign Application Priority Data

Aug. 23, 2013 (JP) ................................. 2013-173730

(51) Int. Cl.
G06F 9/445 (2006.01)
G06F 9/44 (2006.01)

(52) U.S. Cl.
CPC .. *G06F 8/61* (2013.01); *G06F 8/65* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 6,226,747 B1 * | 5/2001 | Larsson et al. .................. 726/31 |
| 2003/0167320 A1 * | 9/2003 | Perez ............................ 709/223 |
| 2006/0277311 A1 * | 12/2006 | Franco et al. ................. 709/229 |
| 2007/0073627 A1 * | 3/2007 | Richards ......................... 705/59 |
| 2007/0150818 A1 * | 6/2007 | Liu .............................. 715/740 |
| 2008/0201748 A1 * | 8/2008 | Hasek et al. .................... 725/98 |
| 2009/0113392 A1 * | 4/2009 | Wijenayake et al. ......... 717/124 |
| 2009/0193444 A1 * | 7/2009 | Clark et al. ................... 719/331 |
| 2011/0004874 A1 * | 1/2011 | Nakashima .................. 717/175 |
| 2011/0016418 A1 * | 1/2011 | Fujita et al. .................. 715/769 |
| 2011/0126177 A1 * | 5/2011 | Charters et al. .............. 717/136 |
| 2013/0124696 A1 * | 5/2013 | Chu et al. ..................... 709/219 |
| 2014/0286345 A1 * | 9/2014 | Mohandas et al. ............ 370/401 |

OTHER PUBLICATIONS

OSGi Alliance, http://www.osgi.org/Download.Release4V40, retrieved Jun. 26, 2014, published Oct. 1, 2005, p. 1/1.

* cited by examiner

*Primary Examiner* — Chameli Das
(74) *Attorney, Agent, or Firm* — Carter, DeLuca, Farrell & Schmidt, LLP

(57) ABSTRACT

An information processing apparatus performs installation when a number of the extension applications that are installed to extend the host application is less than or equal to a maximum number of the extension applications that can be held by the host application as described in a manifest of the host application, during installation of an extension application that extends a host application.

7 Claims, 17 Drawing Sheets

INFORMATION PROCESSING APPARATUS, CONTROL METHOD THEREOF, AND STORAGE MEDIUM

BACKGROUND OF THE INVENTION

1. Field of the Invention

The present invention relates to an information processing apparatus, a control method thereof, and a storage medium.

2. Description of the Related Art

In recent years, an application operating environment, of which JAVA® is a representative example, has been proposed for an image forming apparatus. A technique has been proposed that uses the portability of a program that includes JAVA® to provide expandable applications. In order to enhance the functions or usability of the image forming apparatus, an application is created that is operated in an environment such as a JAVA® environment and is installed on the image forming apparatus to thereby realize a desired function by the application.

There is OSGi, which is a JAVA® application platform for an embedded device, as an application platform ("OSGi Service Platform Release 4", October 2005). The OSGi is an abbreviation for Open Services Gateway Initiative Service Platform, and is hereinafter described as OSGi. The OSGi defines a bundle as a software module management unit, and defines a specification for managing a lifecycle that consists of install/startup/stop/update/uninstall. In this context, the bundle designates a JAVA® module, and is the same definition as an application in the present invention. This type of application platform enables provision to the application of embedded functions such as copying, scanning and printing.

There are specifications of a host bundle and a fragment bundle in the specification of the OSGi. The host bundle designates a bundle that includes addition of the fragment bundle. The fragment bundle does not operate independently and is a bundle having the form adding (attaching) the bundle itself in the class loader space of the host bundle. During revision or extension of an application, use of the fragment bundle for revision or extension of the host bundle functions enables a reduction in the file size to be installed and efficient distribution of the module. In the present situation, there is no limitation in relation to the number of fragment bundles installed onto the host bundle on an OSGi specification.

However, the specification of the current OSGi does not include a feature in which a limitation is added to the possible number of fragment bundles that are added to a single corresponding host bundle. For example, when a user has the intention to use the application in the form of a trial copy, it is not possible to discriminate from the normal application by provision a fixed limitation on the additional number of fragment bundles in the trial copy.

SUMMARY OF THE INVENTION

The present invention provides an information processing apparatus that limits the number of fragment bundles that can be added to a host bundle to thereby improve the provision form of an application provision service.

According to an aspect of the present invention, an image processing apparatus that includes a framework configured to manage an application which provides a specific service, based on a manifest of the application; and an installing unit configured to execute installation when a number of extension applications that are installed to extend a host application is less than or equal to a maximum number of the extension applications, that can be held by the host application, described in the manifest of the host application, during installation of the extension application that extends the host application.

According to the present invention, the information processing apparatus limits the number of fragment bundles that can be added to the host bundle to thereby improve the provided form of the application provision service.

Further features of the present invention will become apparent from the following description of exemplary embodiments (with reference to the attached drawings).

DESCRIPTION OF THE EMBODIMENTS

Figure 1:
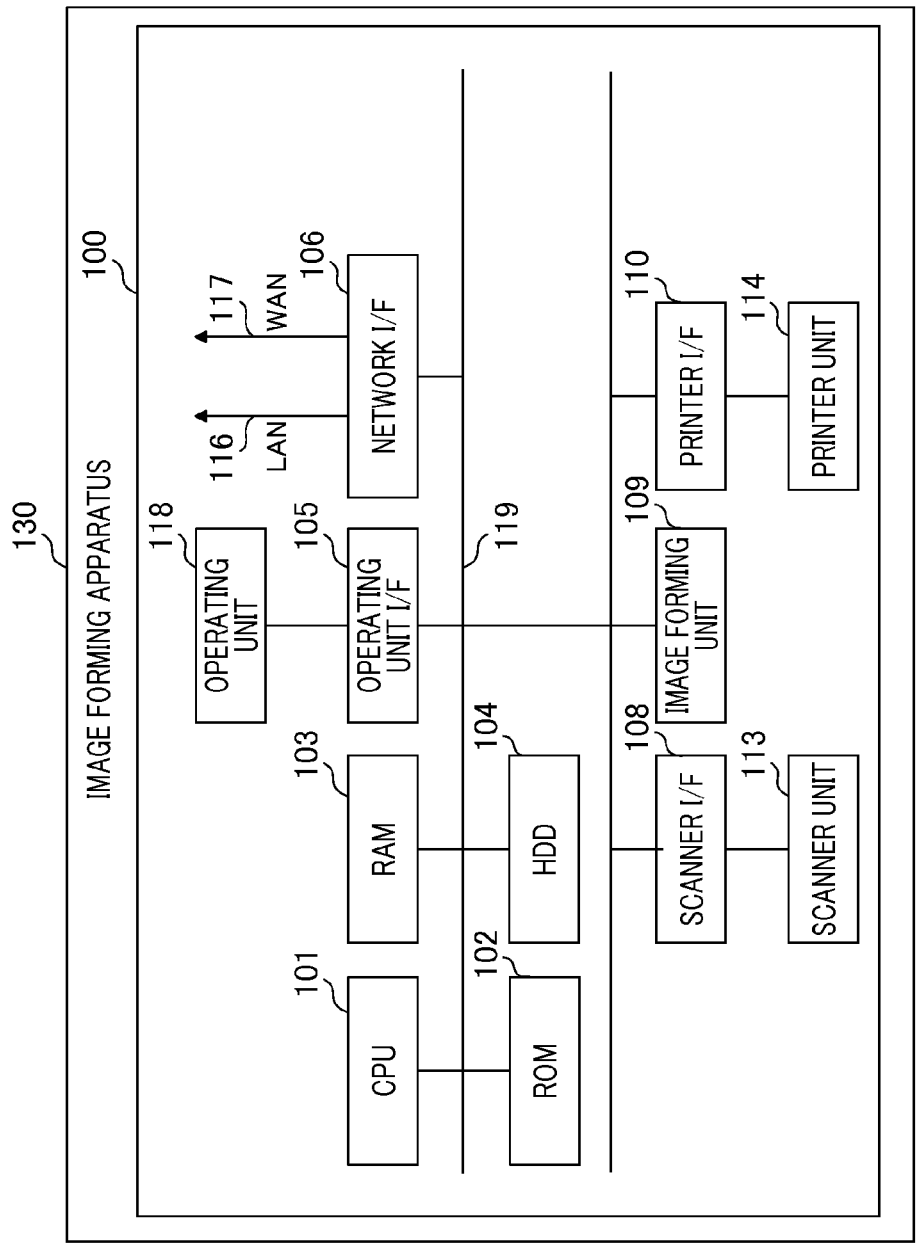
FIG. 1 is a diagram illustrating a hardware configuration example of an image forming apparatus.

A description will be given of definitions of the terms used in the present invention. A "host bundle" is a bundle that is the object of addition of a fragment bundle. A "fragment bundle" is not operated independently, and is a bundle configured to add itself in the class loader space of the host bundle. The addition of a fragment bundle to the host bundle is termed below "install the fragment bundle". In the same manner, a feature in which a fragment bundle after addition to the host bundle is deleted is termed "uninstall the fragment bundle". The relationship of host bundle: fragment bundle=1: N is defined on the specification of the Open Services Gateway Initiative Service Platform, and a fragment bundle can only be added to one host bundle.

As described the above, when the fragment bundle is used as an extension application for extending the functions of the host application, the licensed version cannot be discriminated from the trial version if a plurality of fragment applications are added without limit to the host bundle. Furthermore, there is a further increase in the combination patterns for the host bundle and the fragment bundle. In this manner, a development scale including a test or the like may be increased. The number of combinations may be suppressed by limiting the number of fragment bundles that can be added to thereby enable the development scale to stabilize.

Firstly, in the specification of the current OSGi, the number cannot be limited during installation of the fragment bundles when considering a numerical limitation for the fragment bundles (event 1).

When the host bundle itself is overwritten and installed during a version update or the like, an inconsistent configuration occurs due to the change in the fragment maximum number that is held by the host bundle (event 2).

Furthermore, in relation to event 1, when the host bundle is an application that is constantly ON, a limitation such that the host bundle cannot be turned OFF does not take into account the feature of scheduled installation/uninstallation for updating processing during rebooting (event 3).

In relation to event 1, the limited number cannot be controlled with reference to the use of the fragment bundle (event 4).

Since there is a resource limitation on the overall image forming apparatus, a limitation on the fragment bundle number cannot be realized as a setting for the overall image forming apparatus (event 5).

A description will be given of the configuration that is shared by each embodiment. FIG. 1 is a diagram illustrating a hardware configuration of an image forming apparatus 130 that includes a printing function, scanning function, network function, or the like. In the following description, although the image forming apparatus 130 will be described as an information processing apparatus, the present invention can be adopt to a PC, a portable terminal or the like. The image forming apparatus 130 illustrated in FIG. 1 includes a controller 100. The controller 100 includes a CPU 101, a ROM 102, a RAM 103, a HDD 104, an operating unit I/F 105, a network I/F 106, a scanner I/F 108, an image forming unit 109, and a printer I/F 110. The image forming apparatus 130 includes a scanner unit 113, a printer unit 114, and an operating unit 118. "CPU" is an abbreviation for central processing unit. "ROM" is an abbreviation for read only memory. "RAM" is an abbreviation for random access memory. "HDD" is an abbreviation for hard disk drive. The controller 100 is electrically connected to the scanner unit 113 and the printer unit 114 and is connected with external devices through a LAN 116.

Figure 3:
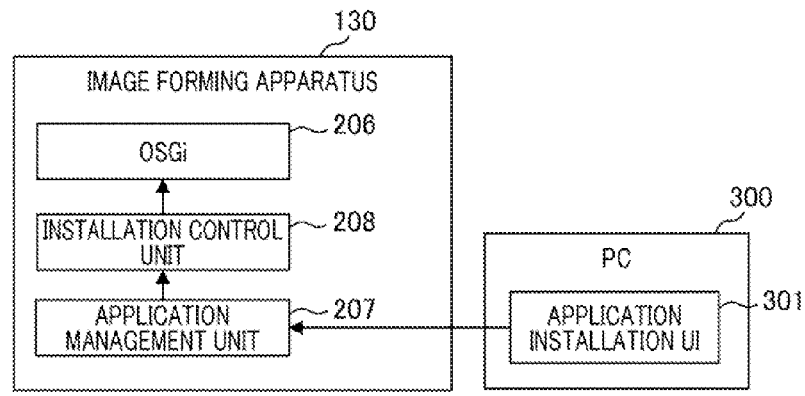
FIG. 3 is a block diagram illustrating the flow of installing an application.

The CPU 101 integrally controls the access to respective types of hardware based on the control program or the like stored in the ROM 102 and integrally controls the respective processing operations performed in the controller. The ROM 102 is a read-only non-volatile storage region, and stores the boot program or the like for the image forming apparatus 130. The RAM 103 is a system work memory that is operated by the CPU 101, and is a memory for temporary storing various types of data. The RAM 103 is configured by a FRAM (registered trademark) and a SRAM that can hold the stored contents after the power source is switched to the OFF position, a DRAM in which the stored contents is deleted after the power source is switched to the OFF position, or the like. The HDD 104 is a non-volatile storage region and stores the system application, or the like. A firmware that includes an application that is installed as described in FIG. 3 is stored in the HDD 104.

The operating unit I/F 105 is an interface unit configured to connect the system bus 119 with the operating unit 118. More specifically, the operating unit I/F 105 acquires data displayed on the operating unit 118 from the system bus 119, displays the data, and outputs input information from the operating unit 118 to the system bus 119. Information presentation or user instructions to the image forming apparatus 130 are performed through the operating unit 118. The network I/F 106 is connected to the LAN 116, the WAN 117 and the system bus 119, and performs input and output of information with an external unit. In the present embodiment, the image forming apparatus 130 installs the application from the PC 300 as illustrated in FIG. 3 through the network I/F 106.

The scanner I/F 108 is an interface unit configured to connect the system bus 119 and the scanner unit 113. The scanner I/F 108 performs correction, processing and editing in relation to image data acquired from the scanner unit 113. The image forming unit 109 performs orientation changing, image compression, and decompression of the image data, or the like. The printer I/F 110 receives the image data sent from the image forming unit 109, and prints on the printer unit 114 after image formation.

Figure 2:
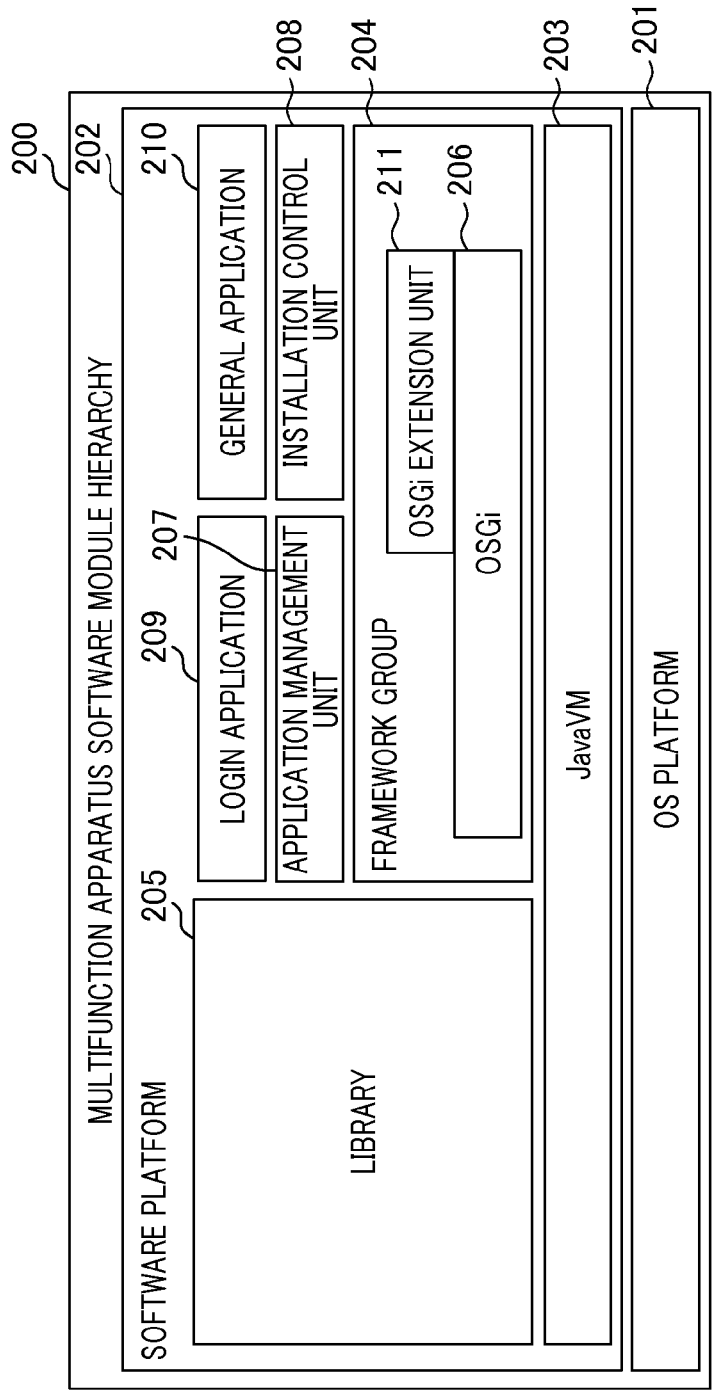
FIG. 2 is a diagram illustrating a software module hierarchy of the image forming apparatus.

FIG. 2 is a diagram illustrating a software module hierarchy of the image forming apparatus 130. The respective software illustrated in FIG. 2 and following drawings is stored on the ROM 102 or the HDD 104, and executed by the CPU 101. The various types of information that are used during execution are stored on the RAM 103 or the HDD 104, and exchange of the various types of information is performed between the software functions. Communication with the external device is performed using the network I/F 106.

Next, a description will be given of the respective software provided in the image forming apparatus 130. The software includes an operating system (OS) platform 201. A software platform 202 is provided on the OS 201. The software platform 202 is configured as a runtime environment for JAVA® VM 203, and includes JAVA® VM 203, a framework group 204 and a library 205 as interpreters. The software platform 202 includes an application management unit 207, an installation control unit 208, a login application 209, and a general application 210. The library 205 is configured from a standard API library. The framework group 204 is configured from an OSGi 206. The OSGi 206 can operate a plurality of applications on a single JAVA® VM 203.

The OSGi 206 includes an OSGi extension unit 211. The OSGi extension unit 211 enables extension of the functions of the OSGi 206 as required. The OSGi 206 provides communication functions between the applications, management of the lifecycle of the applications, or the like. Software that performs a plurality of system services is pre-installed on the OSGi 206. The application management unit 207 acts as a system service to manage a plurality of application groups, and performs adding, updating and deleting a new application. The application management unit 207 uses the installation control unit 208 to perform adding, updating and deleting the application. During startup of the image forming apparatus 130, the OSGi 206 startups software configured to execute the system services of the login application 209, the installation control unit 208, the application management unit 207, or the like in accordance with a service startup sequence list stored in the HDD 104.

The general application 210 provides a user with various types of processing operations in the image forming apparatus 130. For example, the general application 210 is an application configured to perform department management of a print limitation, or the like, an application for processing or compression of images, or the like. Also, the general application 210 may be an application configured to manage a login user, or the like. The login application 209 enables inquiry of the login information at an arbitrary timing from an arbitrary application during the login for the application, and therefore is an application that has the characteristic that it cannot be turned OFF. Since the login information cannot be acquired when the login application is turned OFF, acquisition of data is failed and an operational fault occurs, for example, if there is an application that uses data linked to login information. Here, the login information designates information such as the login name, the mail address or the like of a user that is currently logged into the image forming apparatus 130. As a result of the above characteristic, when the image forming apparatus 130 is starting up, one login application 209 must always be operated.

The general application 210 configured to realize respective functions is operated under the management of the application management unit 207. The application management unit 207 holds application information including the version of the application added under management, and license information, or the like. In response to an uninstall instruction for the application in the image forming apparatus 130, the application management unit 207 excludes the general application 210 from the objects to be managed. The general application 210 or the login application 209 can be provided in a configuration of the host bundle and the fragment bundle as described in FIG. 4.

Figure 5:
FIG. 5 is a diagram illustrating the UI of an installing screen and an application management screen.

FIG. 3 is a block diagram illustrating the flow of installing the application from the PC 300 onto the image forming apparatus 130. An installation UI 301 for an application constructed on a WEB page illustrated on the installation screen 520 in FIG. 5 is displayed on the WEB browser (not illustrated) of the PC 300. The user specifies an application to be installed using the installation UI 301, and performs installation. The application management unit 207 receives the application that is specified on the installation UI 301 and transfers the application to the installation control unit 208. The installation control unit 208 receives the application file and, transfers the application file to be installed to the OSGi 206 when the installation control unit 208 determines that installation is permitted. The OSGi 206 installs the received application file. The installed application is managed by the OSGi 206. Note that the PC may operate a WEB browser and description of the hardware and software configuration thereof is omitted.

Figure 4:
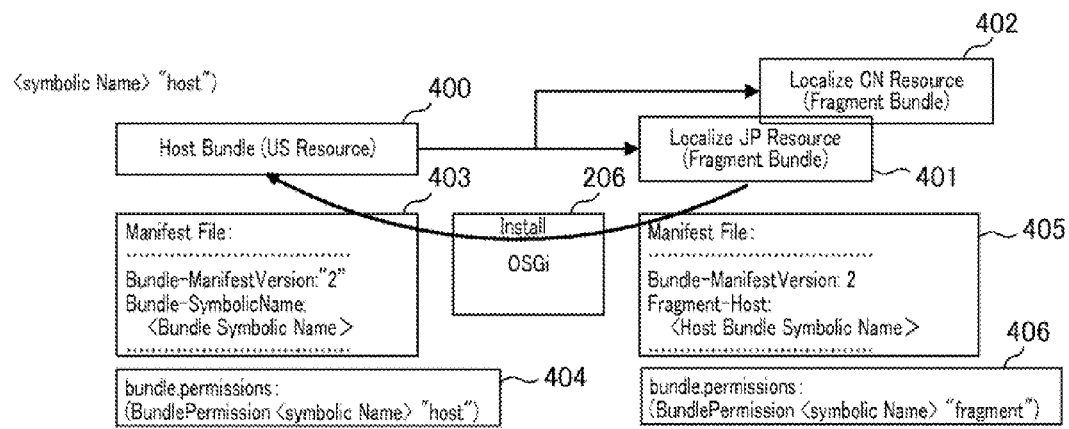
FIG. 4 is a schematic diagram of a fragment bundle.

FIG. 4 is a schematic diagram of a fragment bundle. In this context, an example is illustrated in which the fragment bundles 401 and 402 that include a language localizing resource are installed onto the host bundle 400. Installation of the fragment bundle on the host bundle requires specification of the manifest, and the bundle permission as described below. The manifest is a file that includes the description of a jar file. The jar file is a single summary of the plurality of class files in a single archive.

Manifest 403 of Host Bundle
  A value of 2 is specified to the Bundle-ManifestVersion. An unique name in the framework is named to the Bundle-SymbolicName.
Manifest 405 of Fragment Bundle
  A value of 2 is specified to the Bundle-ManifestVersion. The <bundle symbolic name of the host> described in the manifest 403 of the host bundle is specified in the Fragment-Host. When these values match, it indicates that the fragment bundle and the host bundle are constituent elements of the same application.
Permission 404 of Host Bundle
  BundlePermission [bundle symbolic name, HOST]
Permission 406 of Fragment Bundle
  BundlePermission [bundle symbolic name, FRAGMENT]
  When the fragment bundle is installed in the state where the above conditions are satisfied, the OSGi 206 specifies the host bundle from the manifest information of the fragment bundle, and adds a class path of the fragment bundle itself to the class path of the host bundle. In this context, the term "class path" is a path that specifies the location from which the JAVA® VM should read the class file when the JAVA® application is executed.

All classes and resources in the fragment bundle are loaded by the class loader of the host bundle. In this context, the "class loader" is an object that handles the class load or the search of resources, and all classes are loaded into the JAVA® VM by the class loader to be utilizable as an application. The execution of the loading by the class loader of the host bundle is performed at startup of the host bundle, and therefore it is necessary to always stop the host bundle to execution of the loading after addition of the class path. Therefore, installation is failed when the host bundle has not been stopped. After installation of the fragment bundle, the fragment bundle is available as a portion of the host bundle.

In the example illustrated in FIG. 4, a Japanese language resource 401 and a Chinese language resource 402 is installed as fragment bundles in the host bundle 400 which is the main body. Then, the host bundle 400 uses the Japanese language resource and a Chinese language resource to thereby enable switching of the language resources. That is, although the display on the UI of the host bundle is in English language, switching of the resource on the host bundle enables creation of a host bundle so as to display Japanese language or Chinese language.

The resources may switch image resources in addition to language resources as described herein. Therefore, although an image in English language display is used in the standard, an image in Japanese language display or Chinese language display can be specified by switching the resource on the host bundle. In this context, the fragment bundle is termed a resource fragment bundle.

The functions of the host application can be extended in addition to addition of a resource as described above. For example, the UI that is provided as a standard function can be created in a richer UI configuration by addition of a fragment bundle. In this context, the fragment bundle is termed a function extension fragment bundle.

When a malfunction occurs in relation to a function of the host bundle, provision of a class file in the form of a fragment bundle to correct the malfunction enables a function as a patch to correct the host bundle. In this context, the fragment bundle is termed a correction patch fragment bundle.

During uninstalling of the fragment bundle, in the same manner as for install, it is necessary to delete the class path of the fragment bundle itself from the class path of the host bundle, and use the class loader of the host bundle to load again the classes necessary for the host bundle. Therefore, uninstallation of the fragment bundle must always be performed in a state in which the host bundle is stopped.

FIG. 5 illustrates an installation screen 520 and a management screen 500 for the general application that are managed by the application management unit 207. The screen is displayed on the PC 300. However, the operating unit 118 of the image forming apparatus 130 may display if the Web screen is displayed. In this context, although a description will be given of the management screen of a general application, it is the same screen as the management screen of the login application. Firstly, a description will be given of the management screen 500 of the general application.

The name of general application to be managed is displayed at an application name 501. In the present embodiment, both an application A 507 and an application B 510 are managed. Furthermore, a fragment bundle A 508 and fragment bundle B 509 are managed using the application A 507 as the host bundle. In this case, the display of these fragment bundles is associated with the application A 507 to enable comprehension of linkage to the host bundle.

The installation date 502 is the date of installation of each application. The application ID allocated uniquely to each application is displayed at the application ID 503. The status 504 illustrates the status of each application. "Start" is displayed during startup of an application, and "stop" is displayed during stop. The start/stop button 505 is an instruction button for switching start/stop of the application. When the application is in a startup status, the stop button is displayed, and when the application is in a stop status, the startup button is displayed. When the stop button 505 of an application (in the present example, the "application A 507") in a startup status is depressed, the status 504 is changed to stop. On the other hand, when the start button 505 of an application (in the present example, the "application B 510") in a stop status is depressed, the status 504 is changed to startup. The uninstall button 506 is an instruction button for instructing the uninstallation of each application.

Uninstallation of a fragment bundle targets only the fragment bundle itself. For example, when the uninstall button 511 for the fragment bundle A is depressed, only the fragment bundle A is uninstalled. On the other hand, when the uninstall button 506 for the application A507 which is a host bundle is depressed, all of the fragment bundles are uninstalled. In this context, the fragment bundle A 508 and the fragment bundle B 509, which are linked to the application A 507, are uninstalled at the same time.

Next, a description will be given of the installation screen 520. The browse button 523 displays a screen enabling selection of a file path. When an application file is designated on that screen, a path to the application file is inputted into an application file path 521. In view of security or business related concerns, the application may require a license file to encrypt the application during the installation processing. In that case, when a user depresses the browse button 524, a selection of the file path is displayed in a screen. When the user designates the license file as in the same manner designates the application, a path to the license file is inputted to a license file path 522. When the user depresses the installation button 525, the installation of the application designated on the application file path 521 is started up.

Figure 6:
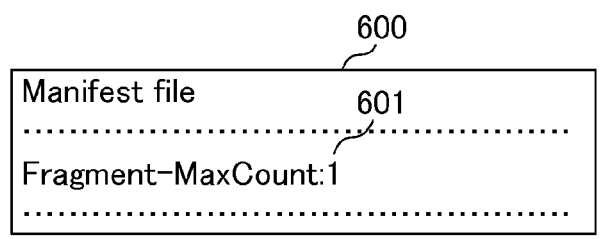
FIG. 6 is a diagram illustrating a manifest that designates a maximum number of fragments.

FIG. 6 illustrates a manifest file 600 in the host bundle 400. A property value of the jar file or the version is described in the manifest file. A manifest item and a value corresponding to each item are also described in the manifest file. The maximum number of the fragment number (Fragment-Max-Count) 601 is one of the manifest items, and denotes the maximum number (hereinafter described as fragment maximum number) of the number of fragment bundles that can be installed in the host bundle. In the present embodiment, a fragment maximum number 1 is designated. Therefore, one or less, that is to say, only one, fragment bundle can be installed on the host bundle. When the maximum number 601 is three, three fragment bundles can be installed. The fragment maximum number described in the manifest may be in a format that can be operated less than the described number. For example, when the maximum number 601 is three, it means that two fragment bundles can be installed. A point to note in relation to this format is that when a numeral such as 1 is described in the maximum number 601, it is not possible to install even a single fragment bundle. Operation is required in light of this point. Furthermore, when a special value is designated by *, it indicates that there is not a maximum number. This manifest item only has meaning in relation to the host bundle, and is not described in a normal application that is not a host bundle, or a manifest file of the fragment bundle.

Figure 7:
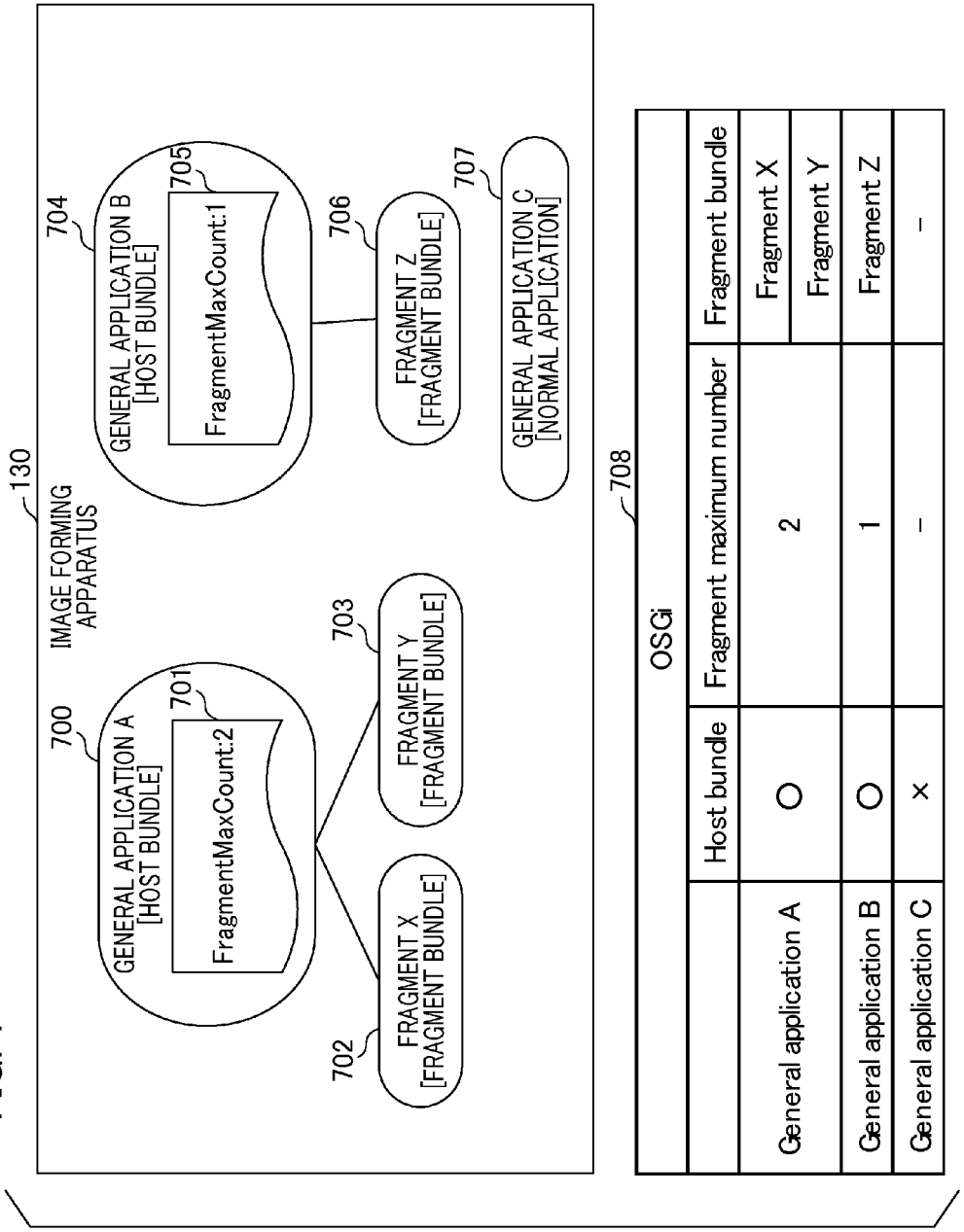
FIG. 7 is a diagram illustrating an application management configuration on OSGi.

FIG. 7 illustrates an example of the management status 708 on the memory of the manifest value and the application due to the OSGi 206. Firstly, a description will be given of the overall applications that are installed on the image forming apparatus 130 and are managed by the OSGi 206. In the present example, a value of 2 as the fragment maximum number 701 is described in the manifest of the general application A 700 that is the host bundle. Furthermore, the fragment X 702 and the fragment Y 703 that are fragment bundles are installed on the general application A 700.

In the same manner, a value of 1 as the fragment maximum number 705 is described in the manifest of the general application B 704 that is a host bundle. The fragment Z 706 that is a fragment bundle is installed on the general application B 704. Furthermore, the general application C 707, that is a normal application and neither a host bundle nor a fragment bundle, is installed.

As illustrated in the management status 708, the OSGi 206 stores on a memory such as the ROM 102, the HDD 104, or the like whether or not the application is a host bundle in addition to the fragment maximum number that is described in the manifest of the application. When the application is a host bundle, the OSGi 206 also stores the association with the fragment, which is linked to the application, on the memory. Those associations, such as the application name, manifest item values and the like that are the objects of processing, are used as keys, and a linked value can be acquired by designating by use of the key. The application name and its status that are the objects of processing can be acquired from the management information of the OSGi.

The installation control unit 208 enquires with the OSGi 206 to thereby acquire the association between the host bundle and the fragment bundle, the fragment maximum number, the number of fragment bundles, or the like. The acquisition method in the present example enables acquisition of information indicating whether or not the general application A is a host bundle by designating the general application A and the host bundle with a key. Furthermore, a maximum number 2 can be acquired by designating the general application A and the fragment maximum number as a key. Information such that the fragment X and the fragment Y are linked to the general application A in addition to the number thereof being 2 can be acquired by designating the general application A and the fragment bundle with a key.

First Embodiment

In the present embodiment, a description will be given of maximum number control in relation to installation of a fragment bundle for a general application. The first embodiment is an example that solves the event 1 described above.

Figure 8:
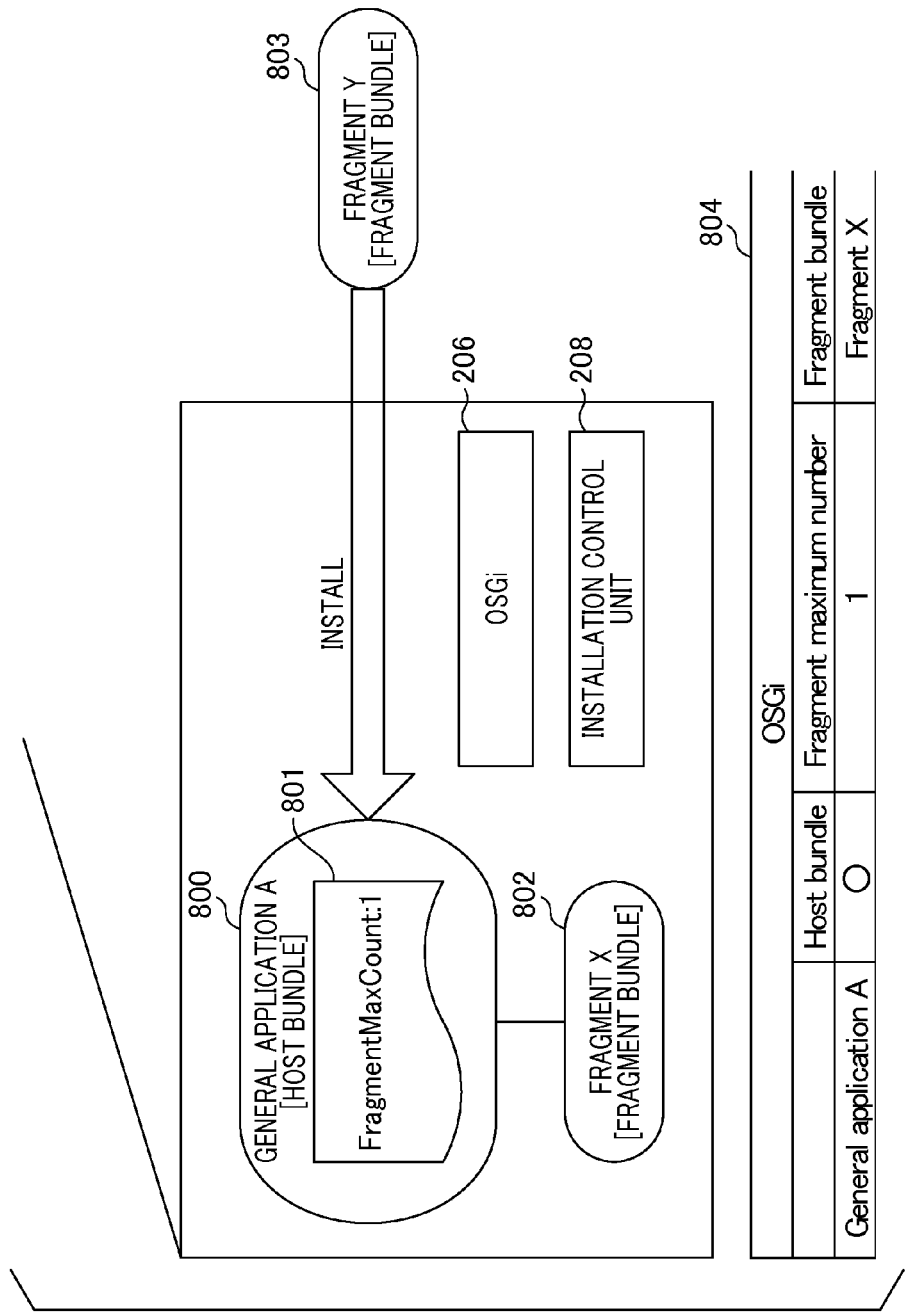
FIG. 8 is a block diagram illustrating a first embodiment.

FIG. 8 is a block diagram illustrating event 1. A value of 1 as the fragment maximum number 801 is described in the manifest of the general application A 800 that is the host bundle. Furthermore, a fragment X 802 that is the fragment bundle is installed. The management status on the memory of the OSGi 206 at this time is denoted as 804.

In this state, installation is considered of the fragment Y 803 that is a fragment bundle to the general application A 800 as the host bundle. The installation control unit 208 enquires with the OSGi 206 for the fragment maximum number of the general application A 800. In this case, a value of 1 is acquired as the fragment maximum number. Furthermore, the installation control unit 208 enquires with the OSGi 206 for the current fragment number of the general application A 800. A value of 1 is acquired as the fragment number. As a result, since the fragment maximum number is exceeded upon installation of the fragment Y 803 that is to be subsequently installed, the installation control unit 208 does not permit installation of the fragment Y 803.

Figure 9:
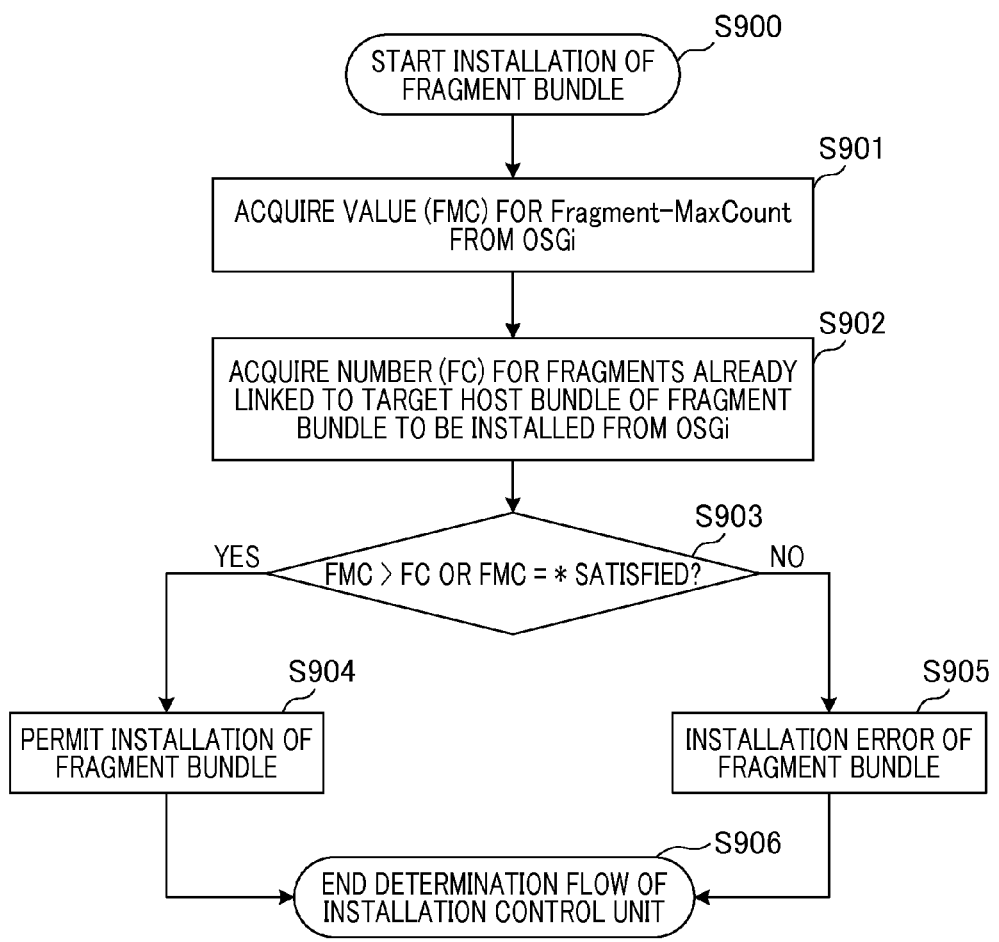
FIG. 9 is a flowchart illustrating the processing of the installing control unit of the first embodiment.

FIG. 9 is a flowchart illustrating the control during installation of a fragment bundle by the installation control unit 208 as illustrated in FIG. 8. The installation control unit 208 starts installation processing of the fragment bundle in response to an instruction from the application management unit 207. In S900, the installation control unit 208 starts installation.

In S901, the installation control unit 208 acquires the fragment maximum number (FMC) for the host bundle to be installed from the OSGi 206. In this context, the FMC is acquired by a key as the fragment maximum number and the general application A that is the host bundle that is the object of installation. In S902, the installation control unit 208 acquires, from the OSGi 206, the fragment number (FC) that has been installed on the host bundle that is the object of installation. In this context, the FC is acquired by a key as the fragment bundle and the general application A that is the host bundle that is the object of installation.

In S903, the installation control unit 208 determines whether FMC>FC or the value for FMC satisfies *. For example, when the fragment maximum number is 2 and the fragment number that is added to the host fragment to be installed is 1, the determination is YES. When the determination is YES, the installation control unit 208 proceeds the processing to S904, and installation of the fragment bundle is permitted. On the other hand, when the determination in S903 is NO, the processing proceeds to S905, and the installation of the fragment bundle is not permitted. In S906, the installation control unit 208 terminates the determination flow.

As described in the first embodiment, when the number of fragment bundles that is described in the manifest satisfies the upper maximum number, control is enabled to execute installation processing. The determination processing in S903 is configured to install the fragment bundle when the fragment number that is added to the host bundle to be installed is less than the fragment maximum number. However, the configuration of the determination processing described below may be applied as substitute processing. That is, the fragment bundle is installed when the fragment number scheduled to be added to the host bundle is less than or equal to the fragment maximum number. Therefore, in the determination processing of S903, the number of the fragment bundle (FC) that is installed to extend the host bundle may be the number of fragments that is already linked to the host bundle, or may be the number of fragments that is scheduled to be added. Installation is executed when either of those fragment numbers is less than or equal to the fragment maximum number of the extension applications that can be held by the host bundle. Furthermore, when the number of fragments that is scheduled for addition is used as a reference to perform the determination processing, it may be determined whether or not the formula such that FMC−FC (number of already linked fragments)>FC (number of fragments that is scheduled for addition) in the processing in S903 is satisfied.

Second Embodiment

In the present embodiment, a description will be given of an example in which the host bundle is installed by overwriting in relation to the case described in the first embodiment. The second embodiment is an example that solves the event 2 described above.

Figure 10:
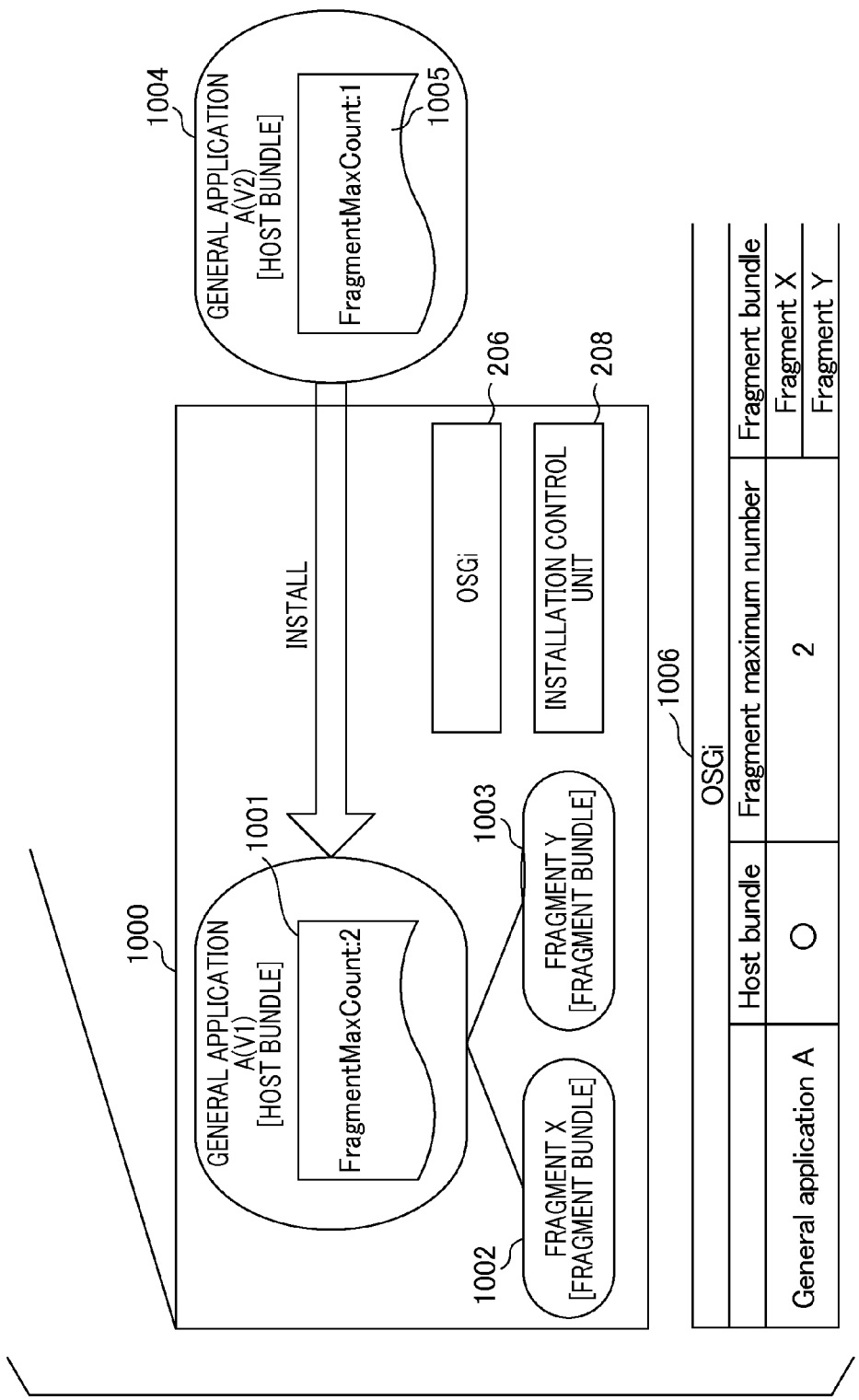
FIG. 10 is a block diagram illustrating a second embodiment.

FIG. 10 is a block diagram illustrating the event 2. A value of 2 as the fragment maximum number 1001 is described in the manifest of the general application A (V1) 1000 that is the host bundle. Furthermore, a fragment X 1002 and a fragment Y 1003 that are the fragment bundles are installed. The management status on the memory of the OSGi 206 in this case is denoted as 1006.

In this configuration, overwrite installation is considered of a version-up host application (general application A (V2) 1004) that is a version update of the general application A (V1) 1000. A value of 1 as the fragment maximum number 1005 in relation to the general application A (V2) 1004 is described in the manifest. The installation control unit 208 makes direct reference to the manifest to acquire the fragment maximum number of the general application A (V2) 1004 that is to be installed. In this context, a value of 1 is acquired as the fragment maximum number. Furthermore, the installation control unit 208 enquires with the OSGi 206 for the current fragment number of the general application A (V1) 1000. In this context, a value of 2 is acquired as the fragment number. As a result, if the general application A (V2) 1004, that is to be installed, is installed by overwriting, the fragment maximum number 1005 is less than the fragment number that is currently linked. Consequently, the installation control unit 208 does not permit installation of the general application A (V2) 1004.

Figure 11:
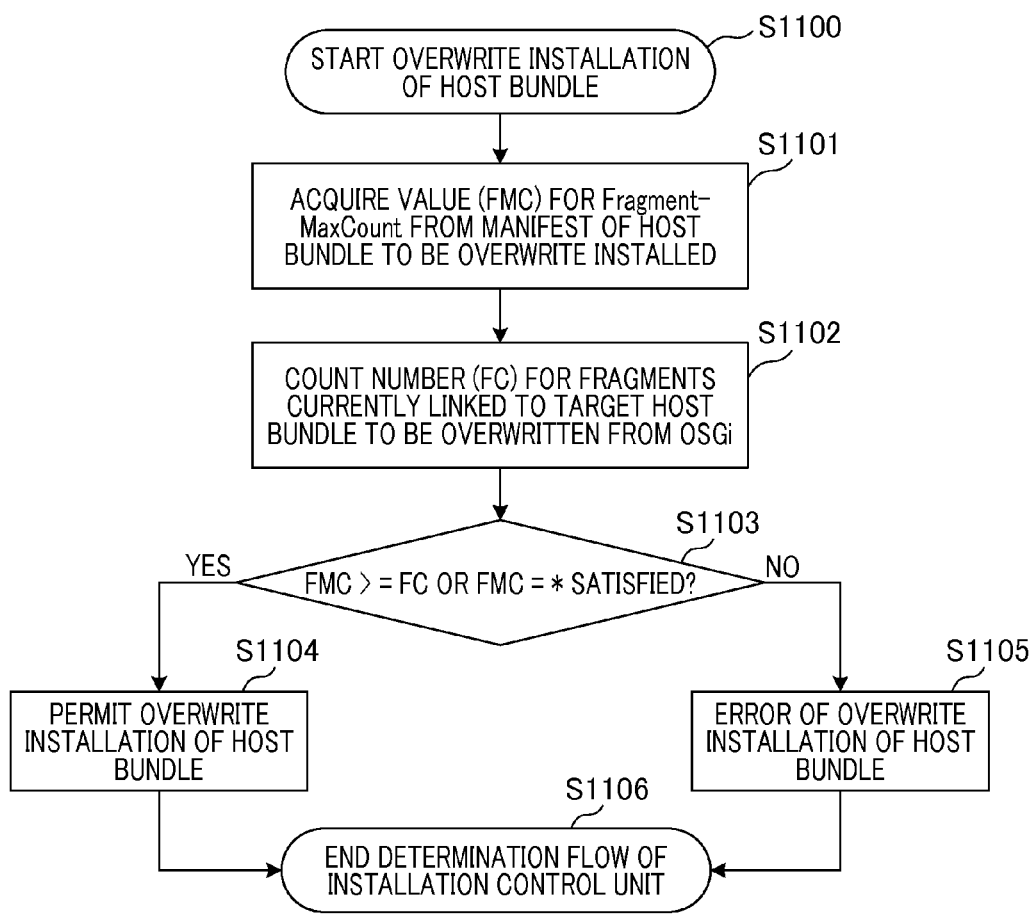
FIG. 11 is a flowchart illustrating the processing of the installing control unit of the second embodiment.

FIG. 11 is a flowchart illustrating the control during overwriting installation of a host bundle by the installation control unit 208 in the case illustrated in FIG. 10. The installation control unit 208 starts overwriting installation processing of the host bundle in response to a command from the application management unit 207.

In S1100, the installation control unit 208 starts installation. In S1101, the installation control unit 208 acquires the fragment maximum number (FMC) from the manifest of the host bundle that is the object of overwriting installation. In this context, the FMC is acquired by a key as the fragment maximum number and the general application A that is the host bundle that is the object of installation.

In S1102, the installation control unit 208 acquires, from the OSGi 206, the fragment number (FC) to be added to the host bundle that is the object of installation. In this context, the FC is acquired by a key as the fragment bundle and the general application A that is the host bundle that is the object of installation.

In S1103, it is determined whether FMC>=FC, or whether the value for FMC satisfies *. When the determination is YES, the installation control unit 208 proceeds the processing to S1104, and overwriting installation of the host bundle is permitted. On the other hand, when the determination in S1103 is NO, the processing proceeds to S1105, and the overwriting installation of the host bundle is not permitted. In S1106, the installation control unit 208 terminates the determination flow.

As described above, matching between the fragment maximum number and the fragment bundle number added to the host bundle can be maintained even during overwriting installation of a host bundle as described in the second embodiment.

Third Embodiment

In the present embodiment, a description will be given of an example in which the host bundle is a login application and scheduled installation/uninstallation is performed as described below in relation to the case described in the first embodiment. The third embodiment is an example that solves the event 3 described above.

Firstly, scheduled installation/uninstallation for the login application will be described. The login application 209 cannot be stopped except when switching to another login application due to the possibility of login information enquiry at an arbitrary timing from an arbitrary application during login. On the other hand, as illustrated in FIG. 4, installation/uninstallation of a fragment bundle requires that the host bundle is stop.

For the above reasons, the following method is proposed when a login application is the host bundle which is started and executing, and fragment bundle of the login application is installed. That is, the installation control unit 208 temporarily stores the installed fragment bundle and a command file, that indicates that installation has occurred, in a storage area such as the ROM 102, the HDD 104, or the like. Then, during rebooting, a method is proposed in which a fragment bundle is installed by the installation control unit 208 according to the command file. This feature is termed scheduled installation of a fragment bundle of a login application. Even when scheduled installation is performed, the fragment remains in an uninstalled configuration until the apparatus is rebooted.

For the same reasons as those above, when a fragment bundle is uninstalled in relation to a login application during startup, the installation control unit 208 stores a command file, that indicates that uninstallation has occurred, in a storage area. Then, during rebooting, a method is proposed in which a fragment bundle is uninstalled by the installation control unit 208 according to the command file. This feature is termed scheduled uninstallation of a fragment bundle of a login application. Even when scheduled uninstallation is performed, the fragment remains in an installed configuration until the apparatus is rebooted.

Figure 12:
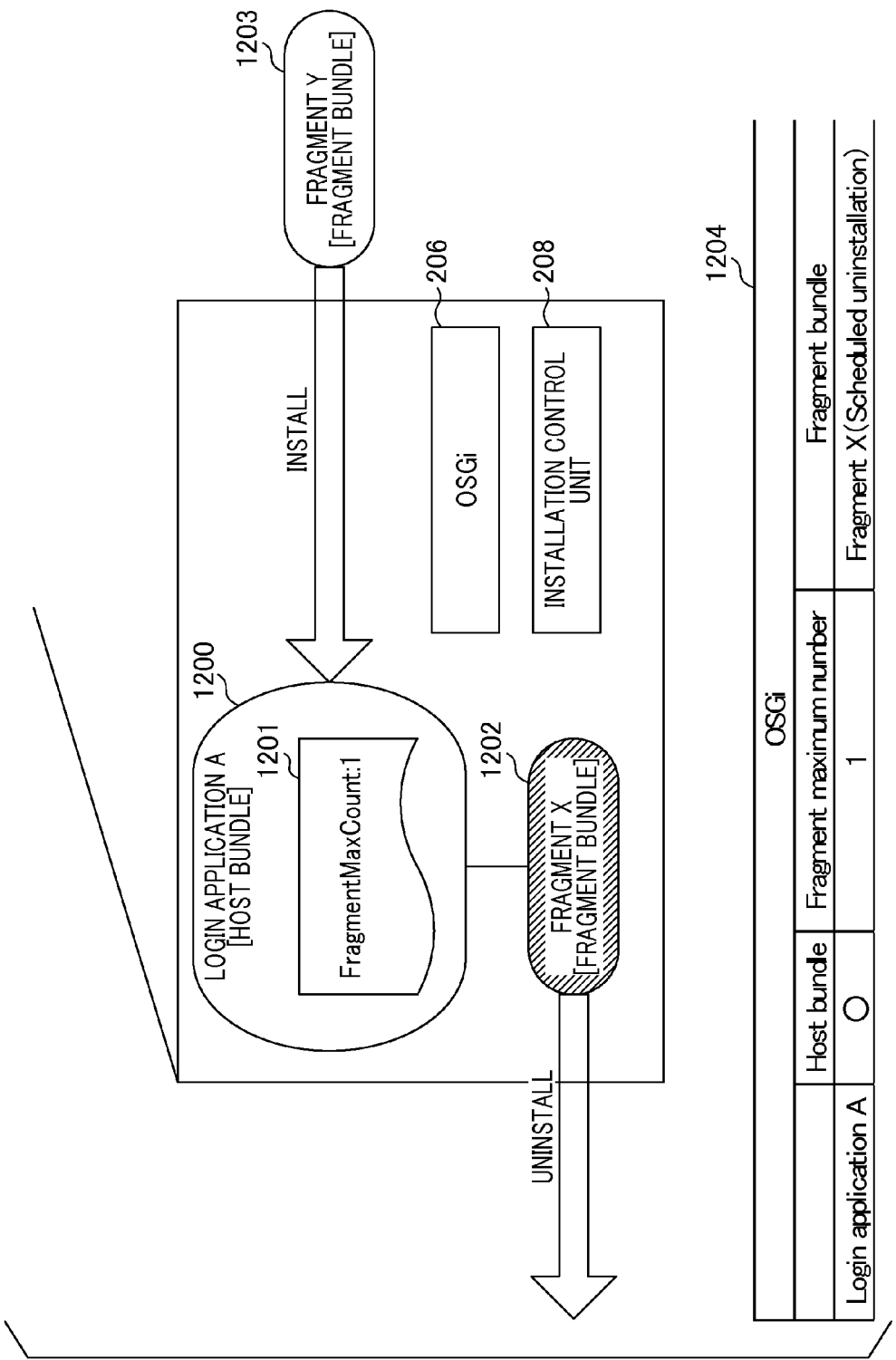
FIG. 12 is a block diagram illustrating a third embodiment.

FIG. 12 is a block diagram that describes the event 3. A value of 1 as the fragment maximum number 1201 is described in the manifest of the login application A 1200 that is the host bundle. The login application A 1200 is starting up. The fragment X 1202, that is a fragment bundle, is installed. In this context, it is assumed that the fragment X 1202 is uninstalled. However, since the login application A 1200 is starting up, it is the object of an uninstallation process, that is to say, scheduled uninstallation. Therefore, the fragment X 1202 is uninstalled after rebooting. The management status on the memory of the OSGi 206 in this case is indicated by 1204.

In this state, installation is considered of the fragment Y 1203, that is the fragment bundle that has the login application A 1200 as a host bundle. However, since the login application A 1200 is starting up, scheduled installation occurs. The installation control unit 208 enquires with the OSGi 206 for the fragment maximum number of the login application A 1200.

In this context, a value of 1 is acquired as the fragment maximum number. Furthermore, the installation control unit 208 enquires with the OSGi 206 for the current fragment number of the login application A 1200. In this case, a value of 1 is acquired as the fragment number. The installation control unit 208 enquires with the OSGi 206 for the current fragment number for the schedule uninstallation by the login application A 1200.

In this case, a value of 1 is acquired as the fragment number for scheduled uninstallation. As a result, even when the fragment Y 1203, that is to be subsequently installed, is installed, when the fragment X 1202 that is subject to scheduled uninstallation is considered, the fragment maximum number 1201 is not exceeded. Therefore, the installation control unit 208 permits scheduled installation of the fragment Y 1203.

Figure 13:
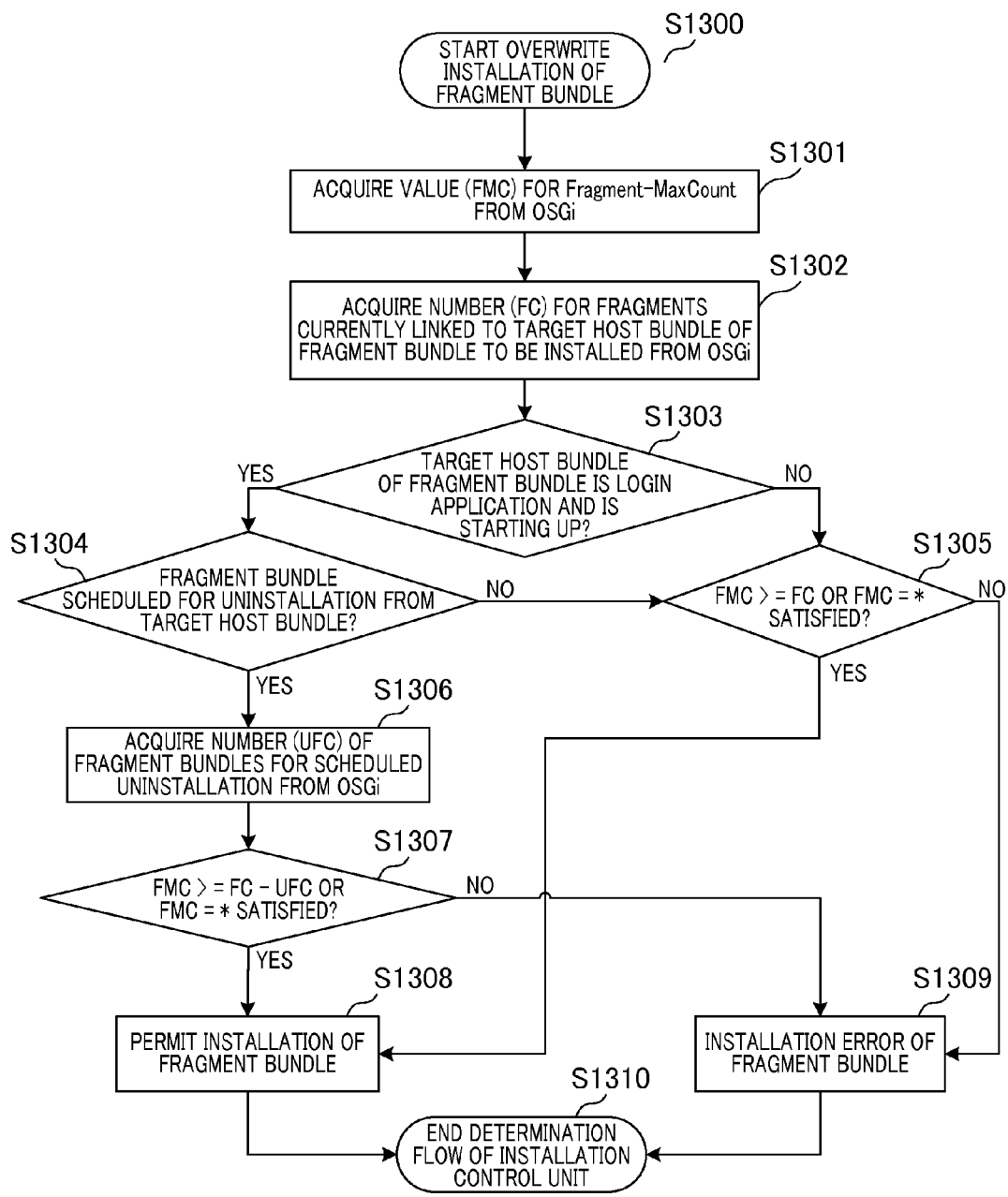
FIG. 13 is a flowchart illustrating the processing of the installing control unit of the third embodiment.

FIG. 13 is a flowchart illustrating the control during fragment bundle installation by the installation control unit 208 in the case illustrated in FIG. 12. The installation control unit 208 starts the installation process of the fragment bundle in response to a command from the application management unit 207.

In S1300, the installation control unit 208 starts installation. In S1301, the installation control unit 208 acquires the fragment maximum number (FMC) of the host bundle that is the object of installation from the OSGi 206. In this context, the FMC is acquired by a key as the fragment maximum number and the login application A that is the host bundle that is the object of installation.

In S1302, the installation control unit 208 acquires, from the OSGi 206, the fragment number (FC) to be added to the host bundle that is the object of installation. In this context, the FC is acquired by a key as the fragment bundle and the login application A that is the host bundle that is the object of installation.

In S1303, the installation control unit 208 determines whether or not the object host bundle for the fragment bundle is a login application, and is starting up. When that determination is NO, the installation control unit 208 proceeds the processing to S1305. Thereafter, the processing is the same as the first embodiment. In S1305, it is determined whether FMC>=FC, or whether the value for FMC satisfies *. When the determination is YES, the installation control unit 208 proceeds the processing to S1308. On the other hand, when the determination in S1305 is NO, the processing proceeds to S1309.

When the determination in S1303 is YES, the installation control unit 208 proceeds the processing to S1304. Then, it is determined whether or not the fragment bundle to be added to the object host bundle is set for scheduled uninstallation from OSGi. When the determination is NO, the installation control unit 208 proceeds the processing to S1305. When the determination in S1304 is YES, the processing proceeds to S1306. In S1306, the installation control unit 208 acquires the fragment bundle number (UFC) for scheduled uninstallation from the OSGi and proceeds the processing to S1307. The number of the UFC is acquired based on the scheduled uninstallation state of the fragment X that is acquired by a key as the fragment bundle and the login application A that is the host bundle to be installed.

In S1307, the installation control unit 208 determines whether FMC>=FC−UFC, or whether the value for FMC satisfies *. When the determination is YES, the installation control unit 208 proceeds the processing to S1308, and permits installation of the fragment bundle. On the other hand, when the determination in S1307 is NO, the processing proceeds to S1309, and the installation of the fragment bundle is not permitted. In S1310, the installation control unit 208 terminates the determination flow.

As described in the third embodiment, installation is possible in which the maximum number of the fragment bundle is controlled in relation to scheduled installation/uninstallation. The above processing assumes that fragments bundles are additionally installed in a one-by-one configuration. Therefore, when there is a plurality of fragment bundles to be added, execution of the processing in FIG. 13 is performed at each fragment bundle. In substitution for that configuration, installation permission/non-permission of the plurality of fragment bundles may be determined at the same time. In this case, the processing in S1307 may determine whether FMC>=FC (number of fragment bundles linked to host bundle)−UFC+number of fragments to be installed (FC), or whether the value for FMC satisfies *.

Fourth Embodiment

In the present embodiment, a description will be given of an example of installation control when the maximum number is changed in response to a use of the fragment bundle. The fourth embodiment solves the event 4 described above.

As described in FIG. 4, a use of the fragment bundle is an application such as use as a resource, use for an extension function, use as a correction patch, or the like. It is assumed that the number limit in relation to each type of application is changed in response to the respective uses. For example, although there is a limit of five languages and one extension function in relation to a trial version, a configuration is considered for service provision to permission without limitation in relation to correction-patch applications.

Figure 14:
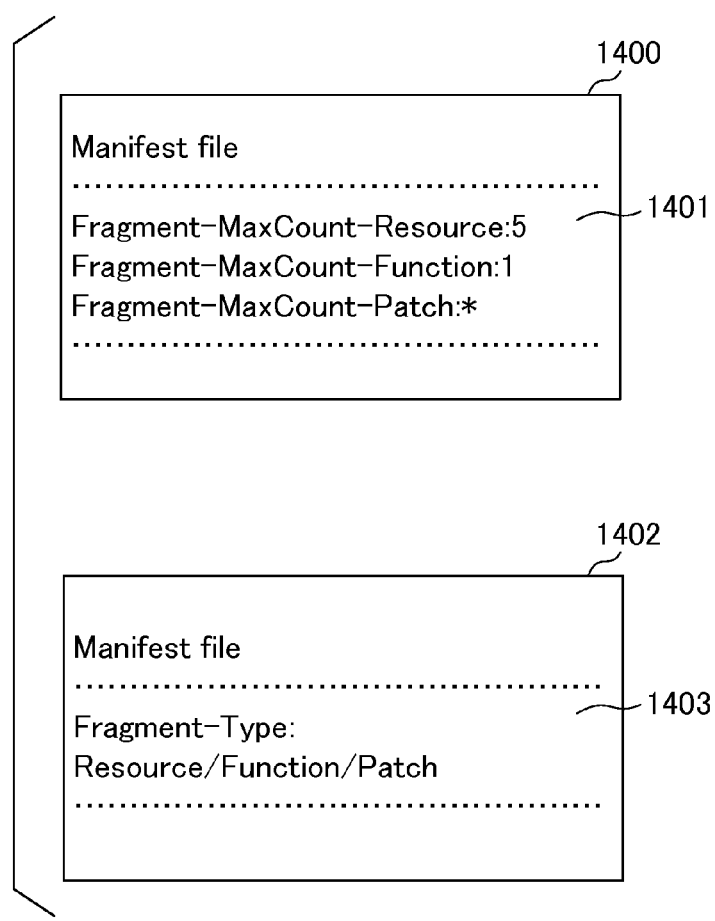
FIG. 14 is a diagram illustrating a manifest indicating the maximum number of fragments for each use in a fourth embodiment.

FIG. 14 illustrates a manifest file 1400 in the host bundle 400 and a manifest file 1402 of the fragment bundle 401. A description will be given of the manifest file 1400. A maximum number (Fragment-MaxCount-Resource) of the number of fragment bundles for a resource use is described as a manifest item 1401. The maximum number (Fragment-MaxCount-Function) is described for the number of fragment bundles for an extension function. Furthermore, the maximum number (Fragment-MaxCount-Patch) is described for the number of fragment bundles for a correction patch. The respective maximum numbers are specified as 5, 1, * (no limit). The manifest item has no meaning other than in relation to a host bundle, and therefore there is no description in a normal application that is not a host bundle, or a fragment bundle.

Next, a description will be given of the manifest file 1402. A fragment bundle type (Fragment-Type) corresponding to a use of the fragment bundle is described as a manifest item 1403. The type is specified as Resource for a resource use, Function for an extension function use, and Patch for a correction patch use. Only one of these features may be specified in a single fragment bundle, or a plurality may be designated.

Figure 15:
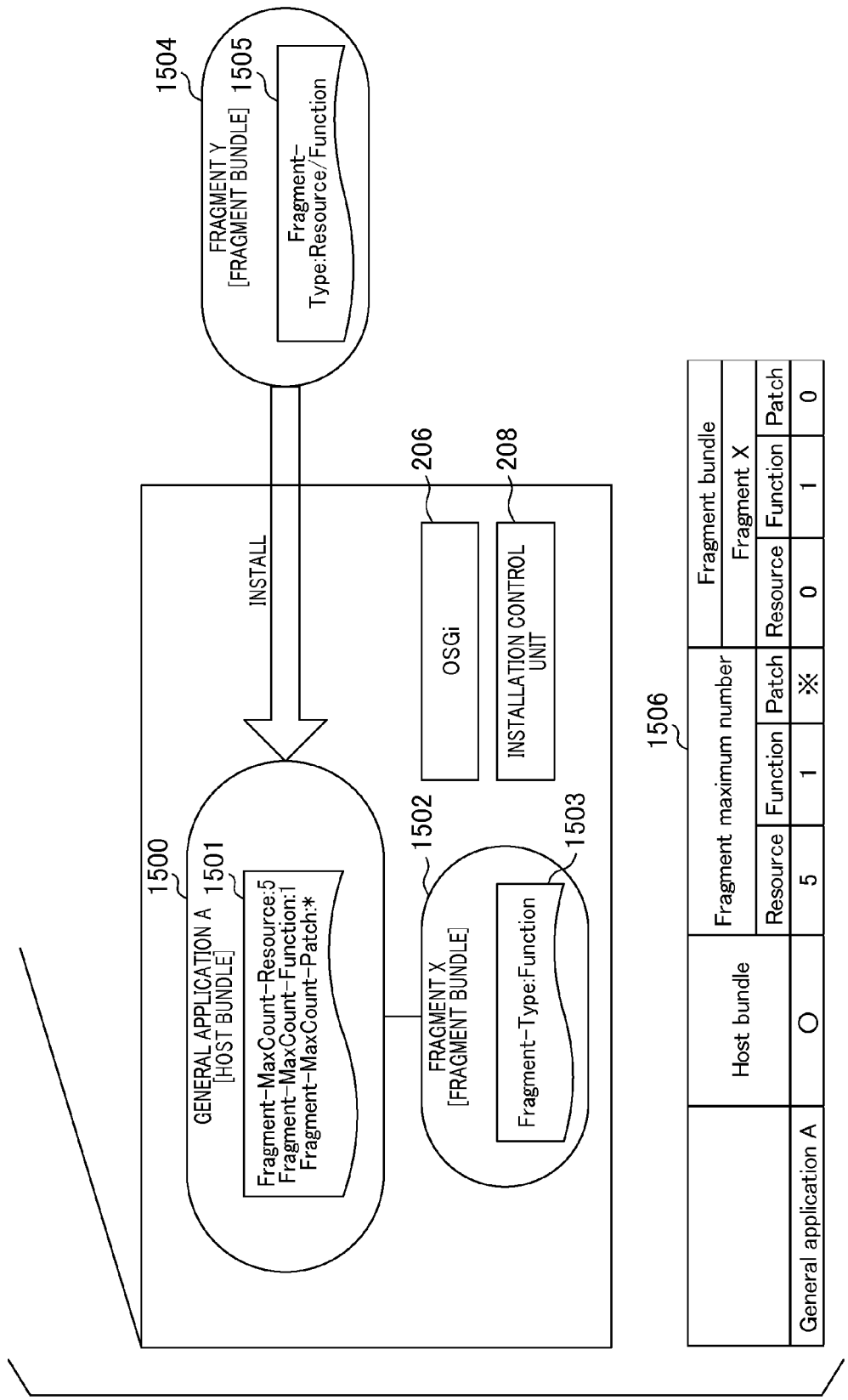
FIG. 15 is a block diagram illustrating the fourth embodiment.

FIG. 15 is a block diagram illustrating the event 4. In the manifest file 1501 of the general application A 1500 that is the host bundle, the resource maximum number is described as 5, the extension function maximum number is described as 1, and the correction patch maximum number is described as *. Furthermore, the general application A 1500 installs the fragment X 1502 that is a fragment bundle. A Function (for the extension function) as the fragment bundle type is described in the manifest file 1503 of the fragment X 1502. The management status on the memory of the OSGi 206 is denoted as 1506.

In this state, installation is considered of the fragment Y 1504 that is a fragment bundle that has the login application A 1500 as a host bundle. A Resource (for the resource)/Function (for the extension function) as the fragment bundle type is described in the manifest file 1505 of the fragment Y 1504. The installation control unit 208 enquires with the OSGi 206 for the fragment maximum number of the general application A 1500 for each respective use.

In this case, the fragment maximum number for the resource use is acquired as a value of 5, the function extension maximum number as 1, and there is no limitation in relation to the maximum number as a correction patch. Then the installation control unit 208 enquires with the OSGi 206 for the fragment number for each current use of the general application A 1500. In this case, a value of zero is acquired for the resource fragment number, a value of 1 for the function extension fragment number, and a value of zero as the correction patch fragment number. As a result, since the fragment Y 1504 to be installed is a resource and function extension type, if installed, the fragment maximum number for the function extension is exceeded. Consequently, the installation control unit 208 does not permit the installation of the fragment Y 1504.

Figure 16:
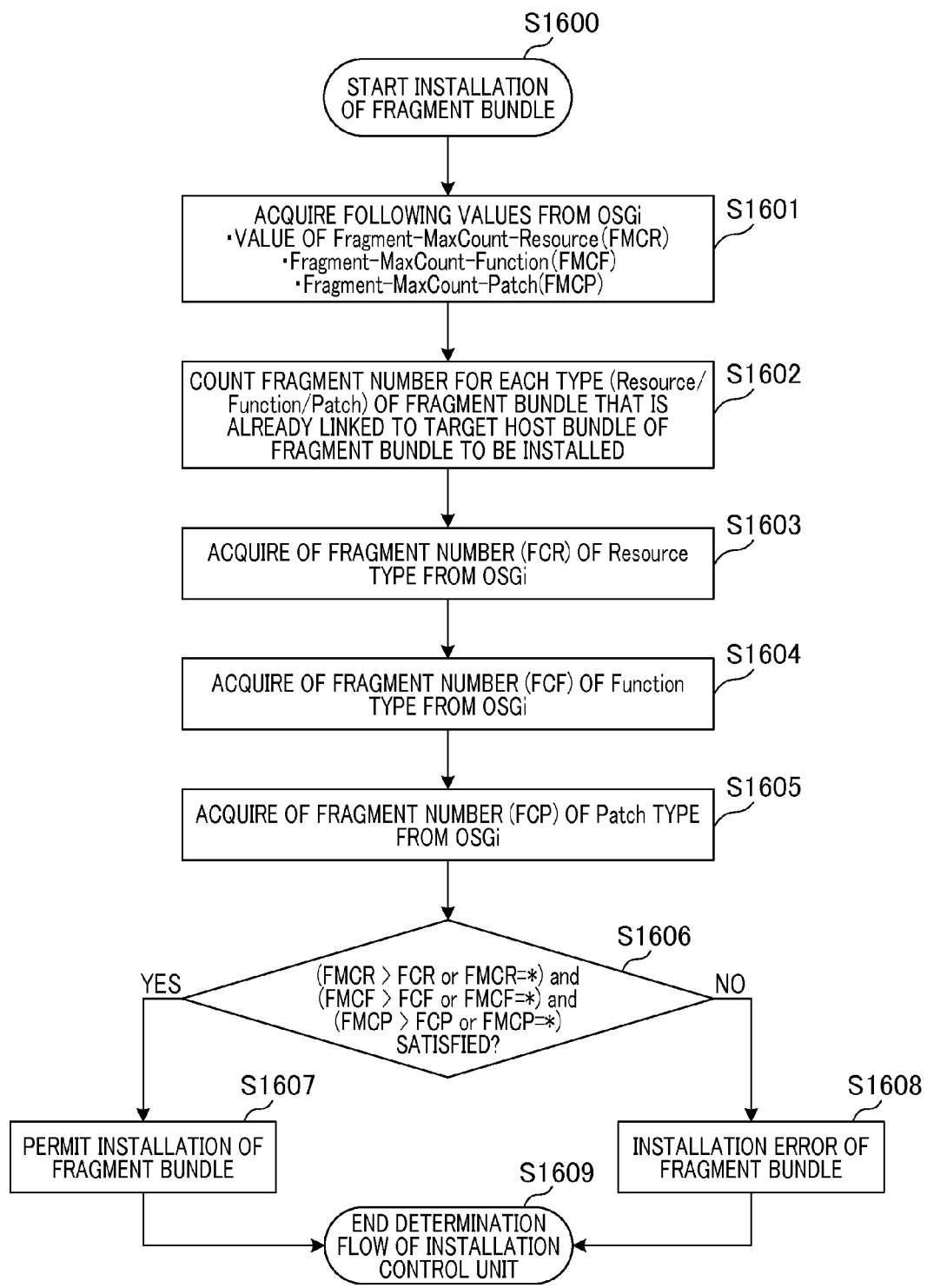
FIG. 16 is a flowchart illustrating the processing of the installing control unit of the fourth embodiment.

FIG. 16 is a flowchart illustrating the control during fragment bundle installation by the installation control unit 208 in the case illustrated in FIG. 15. The installation control unit 208 starts the installation process of the fragment bundle in response to a command from the application management unit 207.

In S1600, the installation control unit 208 starts installation. In S1601, the installation control unit 208 acquires the fragment maximum number from the OSGi 206 for each type of host bundle that is the object of installation. The maximum number of the resource type is denoted as FMCR. The maximum number of the function extension type is denoted as FMCF. The maximum number of the correction patch type is denoted as FMCP. In this context, FMCR is acquired by a key as the fragment maximum number (Resource) and the general application A that is the host bundle to be installed. FMCF is acquired by a key as the fragment maximum number (Function) and the general application A that is the host bundle to be installed. The FMCP is acquired by a key as the fragment maximum number (Patch) and the general application A that is the host bundle that is the object of installation.

In S1602, the installation control unit 208 acquires, from the OSGi 206, the fragment number for each type to be added to the host bundle that is the object of installation. Firstly, in S1603, the fragment number (FCR) for the resource type is acquired. In this context, FCR is acquired by a key as the Resource, the fragment bundle and the general application A that is the host bundle that is the object of installation.

In S1604, the fragment number (FCF) for the function extension type is acquired. In this context, FCF is acquired by a key as the Function, the fragment bundle and the general application A that is the host bundle that is the object of installation.

In S1605, the fragment number (FCP) for the correction patch type is acquired. In this context, FCP is acquired by a key as the Patch, the fragment bundle and the general application A that is the host bundle that is the object of installation.

In S1606, the installation control unit 208 determines whether or not (FMCR>FCR or FMCR=*) and (FMCF>FCF or FMCF=*) and (FMCP>FCP or FMCP=*). When the determination is YES, the installation control unit 208 proceeds the processing to S1607, and permits installation of the fragment bundle. On the other hand, when the determination in S1606 is NO, the installation control unit 208 proceeds the processing to S1608, and installation of the fragment bundle is not permitted. In S1609, the installation control unit 208 terminates the determination flow.

As described in the fourth embodiment, installation is possible in which the maximum number of the fragment bundle for each use is controlled. As described in relation to the first embodiment, the fragment number (FC) used in the determination processing in S1606 may be the number of fragments linked already to the host bundle, or may be the number of fragments that are scheduled to be added. Installation is executed when either number of fragments is less than or equal to the maximum number of the extension applications of each type that can be held by each host bundle.

Fifth Embodiment

In the present embodiment, a description will be given of an example of installation control when the maximum number is designated as a setting for the overall apparatus in response to a resource for the overall apparatus and not as a designation of a maximum number for each host bundle as in the first to fourth embodiments. The fifth embodiment solves the event 5 above.

Figure 17:
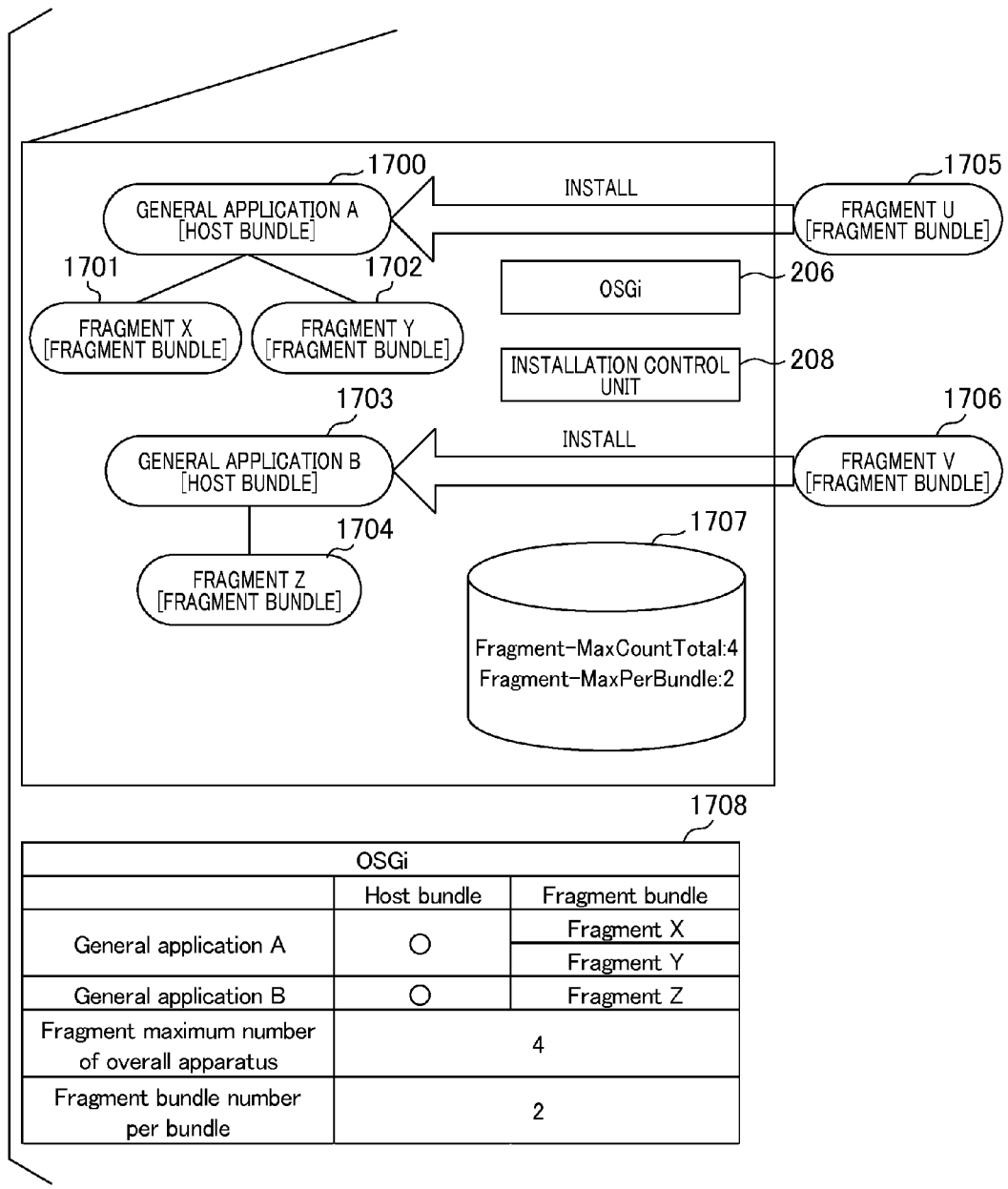
FIG. 17 is a block diagram illustrating a fifth embodiment.

FIG. 17 is a block diagram illustrating the event 5. The fragment X 1701 and the fragment Y 1702 that are fragment bundles are installed on the general application A 1700 that is the host bundle. Furthermore, a fragment Z 1704 that is a fragment bundle is installed on the general application B 1703 that is the host bundle.

According to the resource amount of the apparatus, a maximum number for the fragment number for the overall apparatus and a value for the fragment bundle number per one bundle are stored in a setting value database 1707 of the apparatus. A value that is stored in the database is read by the OSGi during apparatus startup and stored on a memory. The management status of the memory of the OSGi 206 in this case is denoted by 1708. This value can be acquired by a key as the number of the fragment bundle per one bundle and the fragment maximum number for the overall apparatus.

In this state, installation is considered of a fragment U 1705 that is a fragment bundle using the general application A 1700 as an installation address. The installation control unit 208 enquires with the OSGi 206 for the fragment maximum number of the overall apparatus. In this case, the value 4 is acquired as the fragment maximum number. The installation control unit 208 enquires with the OSGi 206 for the fragment maximum number per one bundle. In this case, the value 2 is acquired as the fragment maximum number.

The installation control unit 208 enquires with the OSGi 206 for the fragment number of the overall apparatus. In this case, the value 3 is acquired as the overall fragment number. The installation control unit 208 also enquires with the OSGi 206 for the current fragment number of the general application A 1700.

In this case, the value 2 is acquired as the fragment number. As a result, upon installation of the fragment U 1705 that is to be installed, the fragment bundle number of the overall apparatus is 4, and therefore the fragment maximum number of the overall apparatus is not exceeded. However, the fragment bundle number added to the general application A 1700 is 3, and therefore exceed the fragment maximum number of 2 per one bundle. Therefore, the installation control unit 208 does not permit installation of the fragment U 1705.

Furthermore, in this state, installation is considered of a fragment V 1706 that is a fragment bundle that uses the general application B 1703 as a host bundle. The installation control unit 208 enquires with the OSGi 206 for the fragment number of the overall apparatus. In this case, the value 3 is acquired as the overall fragment number. The installation control unit 208 also enquires with the OSGi 206 for the current fragment number of general application B 1703. In this case, the value 1 is acquired as the fragment number.

As a result, upon installation of the fragment V 1706 that is to be installed, the fragment bundle number of the overall apparatus is 4, and therefore the fragment maximum number of the overall apparatus is not exceeded. Furthermore, the fragment bundle number added to the general application B 1703 is 2, and therefore does not exceed the fragment maximum number of 2 per one bundle. Therefore, the installation control unit 208 permits installation of the fragment V 1706.

Figure 18:
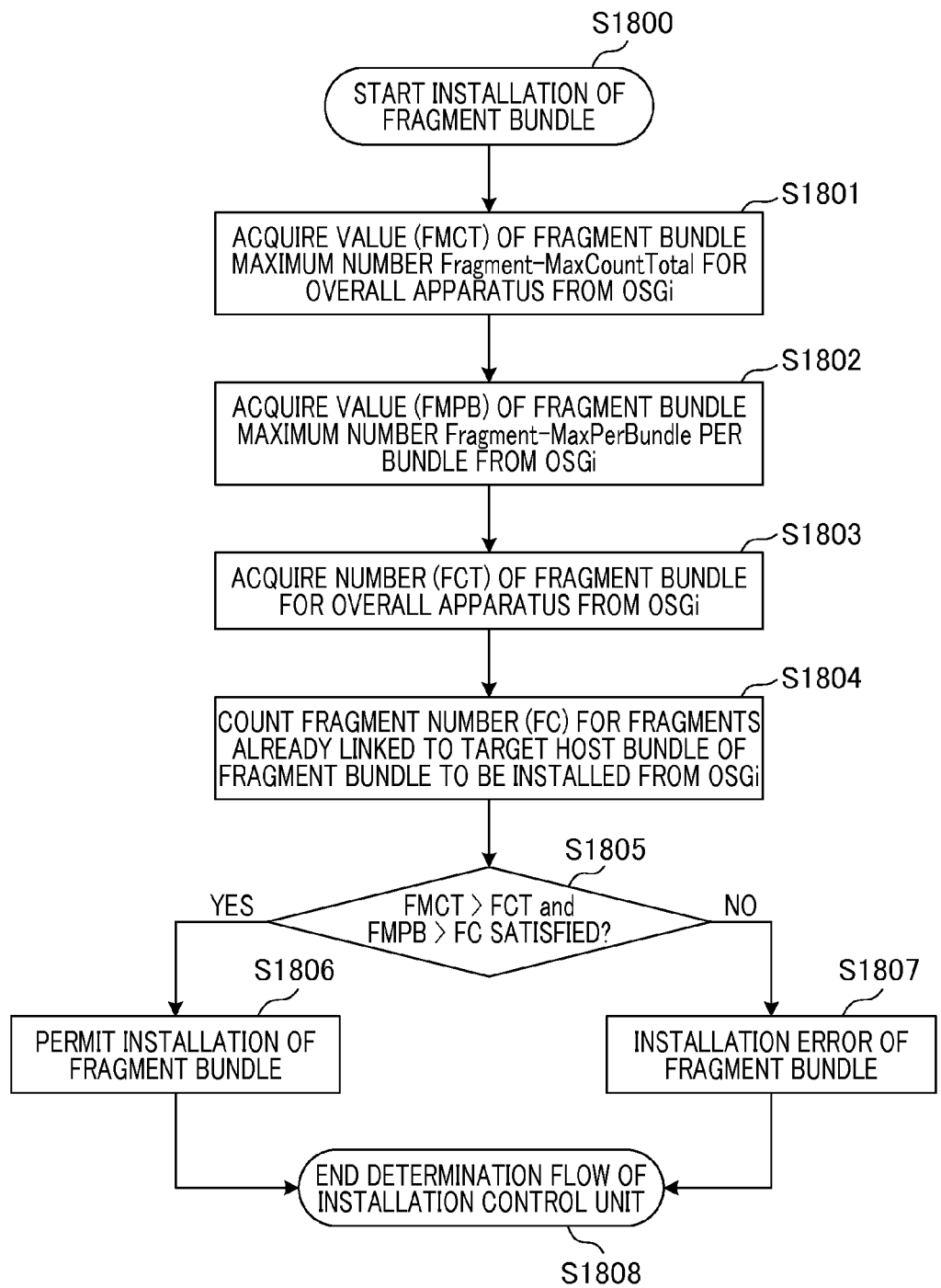
FIG. 18 is a flowchart illustrating the processing of the installing control unit of the fifth embodiment.

FIG. 18 is a flowchart illustrating the control during fragment bundle installation by the installation control unit 208 in the case illustrated in FIG. 8. The installation control unit 208 starts the installation process of the fragment bundle in response to a command from the application management unit 207.

In S1800, the installation control unit 208 starts installation. In S1801, the installation control unit 208 acquires the fragment maximum number (FMCT) for the overall apparatus from the OSGi 206. The FMCT is acquired by a key as the fragment maximum number for the overall apparatus.

In S1802, the installation control unit 208 acquires the fragment maximum number (FMPB) per one bundle from the OSGi 206. The FMPB is acquired by a key as the fragment bundle number per one bundle. In S1803, the installation control unit 208 acquires the fragment number (FCT) for the overall apparatus from the OSGi 206. The acquired FCT is acquired by a key as the fragment maximum number, the general application A and the general application B that are the host bundles for the overall apparatus.

In S1804, the installation control unit 208 acquires from the OSGi 206 the fragment number (FC) that is added to the host bundle that is the object of installation. FC is acquired by a key as the fragment bundle and the general application A that is the host bundle that is the object of installation.

In S1805, the installation control unit 208 determines whether or not FMCT>FCT and FMPB>FC are satisfied. When the determination is YES, the installation control unit 208 proceeds the processing to S1806, and permits installation of the fragment bundle. On the other hand, when the determination in S1805 is NO, the installation control unit 208 proceeds the processing to S1807, and installation of the fragment bundle is not permitted. In S1808, the installation control unit 208 terminates the determination flow.

As described in the fifth embodiment, installation is possible by controlling the maximum number of a fragment bundle as a setting for the overall apparatus. As described in the first embodiment, the fragment number (FC) used in the determination processing in S1805 may be the number of fragments linked already to the host bundle, or may be the number of fragments that are scheduled to be added. Installation is executed when either number of fragments is less than or equal to the maximum number for the extension applications that can be held by each host bundle.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-173730, filed Aug. 23, 2013, which is hereby incorporated by reference herein in its entirety.

What is claimed is:

1. An information processing apparatus comprising:
a framework configured to manage an application which provides a specific service, based on a manifest of the application; and
an installing unit configured to execute installation when a number of extension applications that are installed to extend a host application is less than or equal to a maximum number of the extension applications, that can be held by the host application, described in the manifest of the host application, during installation of the extension application that extends the host application,
wherein the installing unit determines whether or not the host application is being executed during installation of the extension application, and
wherein if the host application is being executed and any one of the extension applications among the extension applications that have been installed on the host application is uninstalled during rebooting, the installing unit executes installation during rebooting when a number, that is calculated by subtracting a number of the extension applications to be uninstalled from a number of the extension applications that have been installed on the host application, is less than or equal to the maximum number of the extension applications that can be held by the host application.

2. The information processing apparatus according to claim 1, wherein the installing unit executes version updating when a number of the extension applications that have been installed on the host application is less than or equal to a maximum number of the extension applications, that can be held by a host application for version updating, described in the manifest of the host application for version updating, during the version updating of the host application.

3. The information processing apparatus according to claim 1, wherein the maximum number of the extension applications that can be held by the host application is described for each type of the extension applications in the manifest, and
wherein the installing unit specifies the type of extension application during installation of the extension application, and executes installation when a number of the specified type of extension applications that have been installed on the host application is less than or equal to the maximum number of the specified type of extension applications.

4. The information processing apparatus according to claim 1, wherein the installing unit executes installation when a number of the extension applications that have been installed on a local apparatus is less than a maximum number of the extension applications that can be held by the local apparatus, and a number of the extension applications that have been installed on a host application on which the extension application is installed is less than or equal to the maximum number of the extension applications that can be held by the host application, during installation of the extension application.

5. The information processing apparatus according to claim 1, wherein a platform for each application is an Open Services Gateway Initiative Service Platform.

6. A control method for an information processing apparatus comprising a framework configured to manage an application which provides a specific service, based on a manifest of the application, the method comprising:
executing installation when a number of extension applications that are installed to extend a host application is less than or equal to a maximum number of the extension applications, that can be held by the host application, described in the manifest of the host application, during installation of the extension application that extends the host application; and
determining whether or not the host application is being executed during installation of the extension application,
wherein if the host application is being executed and any one of the extension applications among the extension applications that have been installed on the host application is uninstalled during rebooting, executing installation during rebooting when a number, that is calculated by subtracting a number of the extension applications to be uninstalled from a number of the extension applications that have been installed on the host application, is less than or equal to the maximum number of the extension applications that can be held by the host application.

7. A non-transitory computer-readable medium storing a program for causing a computer to execute a control method to be executed by an information processing apparatus, the method comprising:
executing installation when a number of extension applications that are installed to extend a host application is less than or equal to a maximum number of the extension applications, that can be held by the host application, described in a manifest of the host application, during installation of the extension application that extends the host application; and
determining whether or not the host application is being executed during installation of the extension application,
wherein if the host application is being executed and any one of the extension applications among the extension applications that have been installed on the host application is uninstalled during rebooting, executing installation during rebooting when a number, that is calculated by subtracting a number of the extension applications to be uninstalled from a number of the extension applications that have been installed on the host application, is less than or equal to the maximum number of the extension applications that can be held by the host application.

* * * * *